(12) United States Patent
Moyle

(10) Patent No.: US 8,825,473 B2
(45) Date of Patent: Sep. 2, 2014

(54) METHOD, COMPUTER PROGRAM AND APPARATUS FOR ANALYZING SYMBOLS IN A COMPUTER SYSTEM

(75) Inventor: Stephen Anthony Moyle, Oxfordshire (GB)

(73) Assignee: Oracle International Corporation, Redwood Shores, CA (US)

( * ) Notice: Subject to any disclaimer, the term of this patent is extended or adjusted under 35 U.S.C. 154(b) by 527 days.

(21) Appl. No.: 13/145,292

(22) PCT Filed: Jan. 19, 2010

(86) PCT No.: PCT/GB2010/050074
§ 371 (c)(1),
(2), (4) Date: Dec. 13, 2011

(87) PCT Pub. No.: WO2010/084344
PCT Pub. Date: Jul. 29, 2010

(65) Prior Publication Data
US 2012/0109639 A1 May 3, 2012

Related U.S. Application Data

(60) Provisional application No. 61/145,881, filed on Jan. 20, 2009.

(51) Int. Cl.
*G06F 17/27* (2006.01)
*G06F 11/00* (2006.01)

(52) U.S. Cl.
USPC .............................................. 704/9; 726/22

(58) Field of Classification Search
CPC ............ H04L 63/1416; H04L 63/1408; H04L 63/145; G06F 21/552; G06F 21/56; G06F 21/562; G06F 21/566

USPC .......................................... 704/9; 726/22–25
See application file for complete search history.

(56) References Cited

U.S. PATENT DOCUMENTS 6,199,034 B1   3/2001  Wical
6,311,278 B1  10/2001  Raanan et al.
(Continued)

FOREIGN PATENT DOCUMENTS

| EP | 1 830 253 | 9/2007 |
| WO | WO 02/09339 A2 | 1/2002 |
| WO | WO 03/090046 A2 | 10/2003 |
| WO | WO 2010/084344 A1 | 7/2010 |

OTHER PUBLICATIONS

U.S. Appl. No. 13/160,365, Jun. 14, 2011, Moyle.
(Continued)

*Primary Examiner* — Samuel G Neway
(74) *Attorney, Agent, or Firm* — Kilpatrick Townsend & Stockton LLP

(57) ABSTRACT

The present invention provides a computer-implemented method of analyzing messages in a computer system to allow workflows constituted by the messages to be identified, the method comprising: analyzing a sequence of messages in a computer system in order to classify the messages, thereby producing a corresponding sequence of classifications of the messages; and, applying sequence induction to the sequence of classifications of the messages to produce (i) a set or sub-sequences of the classifications of the messages and (ii) a sequence grammar for the sub-sequences, from which a workflow constituted by the sequence of messages can be identified.

20 Claims, 5 Drawing Sheets

(56) References Cited

U.S. PATENT DOCUMENTS

| | | | |
|---|---|---|---|
| 6,327,561 | B1 | 12/2001 | Smith et al. |
| 6,470,306 | B1 | 10/2002 | Pringle et al. |
| 7,089,592 | B2 | 8/2006 | Adjaoute |
| 7,228,561 | B2 | 6/2007 | Sameshima et al. |
| 7,243,086 | B2 | 7/2007 | Polak |
| 7,343,624 | B1 | 3/2008 | Rihn et al. |
| 7,415,719 | B2 | 8/2008 | Moghe et al. |
| 7,454,779 | B2 | 11/2008 | Hughes et al. |
| 7,458,094 | B2 | 11/2008 | Jackson |
| 7,487,149 | B2 | 2/2009 | Wong |
| 7,549,162 | B2 | 6/2009 | Aaron |
| 7,657,927 | B2 | 2/2010 | Tajalli et al. |
| 7,712,133 | B2 | 5/2010 | Raikar et al. |
| 7,912,701 | B1 | 3/2011 | Gray et al. |
| 7,983,900 | B2 | 7/2011 | Moyle |
| 8,028,160 | B1 | 9/2011 | Orr |
| 8,122,508 | B2 | 2/2012 | Rihn et al. |
| 8,132,250 | B2 | 3/2012 | Judge et al. |
| 8,145,474 | B1 | 3/2012 | Daily et al. |
| 8,265,925 | B2 | 9/2012 | Aarskog |
| 8,311,806 | B2 | 11/2012 | Bonnet et al. |
| 8,468,244 | B2 | 6/2013 | Redlich et al. |
| 8,479,285 | B2 | 7/2013 | Moyle et al. |
| 8,666,731 | B2 | 3/2014 | Moyle et al. |
| 2002/0037035 | A1* | 3/2002 | Singh .......................... 375/240 |
| 2003/0149562 | A1 | 8/2003 | Walther |
| 2003/0195785 | A1 | 10/2003 | Thalangara et al. |
| 2004/0015719 | A1 | 1/2004 | Lee et al. |
| 2004/0143791 | A1 | 7/2004 | Ito et al. |
| 2004/0153512 | A1 | 8/2004 | Friend |
| 2004/0236839 | A1 | 11/2004 | Wilson et al. |
| 2005/0057378 | A1* | 3/2005 | Savari ............................ 341/51 |
| 2005/0132060 | A1 | 6/2005 | Mo et al. |
| 2005/0283519 | A1 | 12/2005 | Turgeman et al. |
| 2006/0070047 | A1* | 3/2006 | Narayanasamy et al. .... 717/144 |
| 2006/0075099 | A1* | 4/2006 | Pearson et al. ................ 709/225 |
| 2006/0092861 | A1 | 5/2006 | Corday et al. |
| 2006/0150238 | A1 | 7/2006 | D'Agostino |
| 2006/0265745 | A1 | 11/2006 | Shackleton et al. |
| 2007/0055662 | A1* | 3/2007 | Edelman et al. .................. 707/6 |
| 2007/0083856 | A1* | 4/2007 | Chilimbi et al. .............. 717/128 |
| 2007/0185703 | A1* | 8/2007 | Moyle .............................. 704/9 |
| 2007/0214504 | A1 | 9/2007 | Comparetti et al. |
| 2007/0256139 | A1 | 11/2007 | Gaos et al. |
| 2008/0120720 | A1 | 5/2008 | Guo et al. |
| 2008/0134336 | A1 | 6/2008 | Rihn et al. |
| 2008/0141332 | A1 | 6/2008 | Treinen |
| 2008/0222734 | A1 | 9/2008 | Redlich et al. |
| 2008/0282352 | A1* | 11/2008 | Beddoe et al. .................. 726/25 |
| 2009/0044256 | A1 | 2/2009 | Moyle |
| 2009/0063869 | A1 | 3/2009 | Kohavi et al. |
| 2009/0192968 | A1 | 7/2009 | Tunstall-Pedoe |
| 2010/0071061 | A1 | 3/2010 | Crovella et al. |
| 2011/0131034 | A1 | 6/2011 | Moyle |
| 2012/0151590 | A1 | 6/2012 | Rihn et al. |
| 2014/0013335 | A1 | 1/2014 | Moyle et al. |

OTHER PUBLICATIONS

Aho, et al., "Compilers Principles, Techniques, and Tools," Addison-Wesley Publishing Company, Sep. 15, 1985, XP002940830, BNS pp. 1-8 and 149-161.

European Patent Application No. 07250432.7, European Extended Search Report Dated Feb. 18, 2009, 9 pages.

Moyle, et al. "Machine Learning to Detect Intrusion Strategies," published in V. Palade, 7th International Knowledge-Based Intelligent Information and Engineering Systems (KES 2003), LNAI 2663, pp. 371-378, Oxford, 2003. Springer-Verlag Heidelberg.

Muggleton, S.H., "Learning from positive data", Proceedings of the Sixth International Workshop on Inductive Logic Programming (ILP-96), Lecture Notes in Artificial Intelligence 1314, pp. 358-376, Berlin, 1996. Springer-Verlag.

Non-Final Office Action for U.S. Appl. No. 11/672,253 mailed Aug. 5, 2010, 9 pages.

Non-Final Office Action for U.S. Appl. No. 12/187,104 mailed Aug. 6, 2010, 9 pages.

Final Office Action for U.S. Appl. No. 12/187,104 mailed Jan. 4, 2011, 9 pages.

Notice of Allowance for U.S. Appl. No. 12/187,104 mailed Mar. 14, 2011, 7 pages.

Non-Final Office Action for U.S. Appl. No. 12/187,113 mailed Apr. 28, 2011, 22 pages.

Final Office Action for U.S. Appl. No. 12/187,113 mailed Nov. 9, 2011, 12 pages.

Advisory Action for U.S. Appl. No. 12/187,113 mailed Jan. 12, 2012, 3 pages.

Non-Final Office Action for U.S. Appl. No. 12/187,113 mailed Apr. 5, 2012, 14 pages.

Nevill-Manning, C. G. et al., "Compression and explanation using hierarchical grammars", Computer Science Department, University of Waikato, New Zealand, 1997, 22 pages. Retrieved from the Internet: <<http://citeseerx.ist.psu.edu/viewdoc/summary?doi=10.1.1.57.1150>>.

Notification of Transmittal of the International Search Report and Written Opinion of the International Searching Authority, or the Declaration; International Search Report and Written Opinion of the International Searching Authority for corresponding International Application No. PCT/GB2010/050074 mailed on May 18, 2010, 17 pages.

Non-Final Office Action for U.S. Appl. No. 12/887,725 mailed Sep. 25, 2012, 11 pages.

Non-Final Office Action for U.S. Appl. No. 12/187,113 mailed Oct. 22, 2012, 6 pages.

Advisory Action for U.S. Appl. No. 12/887,725 mailed Mar. 7, 2013, 7 pages.

Notice of Allowance for U.S. Appl. No. 12/187,113 mailed May 9, 2013, 17 pages.

Non-Final Office Action for U.S. Appl. No. 12/887,725 mailed Jun. 3, 2013, 16 pages.

Final Office Action for U.S. Appl. No. 12/887,725 mailed Dec. 28, 2012, 14 pages.

U.S. Appl. No. 12/887,725, Notice of Allowance mailed on Oct. 11, 2013, 14 pages.

European Patent Application No. 07250432.7, Article 94(3) EPC Communication mailed on Oct. 13, 2009, 1 page.

European Patent Application No. 07250432.7, Article 94(3) EPC Communication mailed on Jun. 30, 2010, 7 pages.

\* cited by examiner

| Message Classification | Message |
|---|---|
| 13428614 | select max(Sno), min(Sno) from tbl_Syslog |
| 440536710 | select 100 |
| 376125926 | SELECT t3.Sno, t3.MasterIP, t3.MasterPort, t3.SlaveIP, t3.SlavePort, t3.Mode, t3.Enable, t3.Status, t3.Remark, t3.FilterSeverity, t3.FilterString, t3.ForwardNoForNMS, t3.DeleteNoForNMS, t3.ForwardNoForNE, t3.DeleteNoForNE, t3.AlarmState FROM tbl_SyslogServer t3 |
| 440536710 | select 100 |

Fig. 3

13428614→440536710→376125926→440536710→13428614→440536710→376125926→440536710→13428614→440536710→376125926→440536710→...<100's more>→376125926→440536710→13428614→440536710→376125926→440536710

Fig. 4

METHOD, COMPUTER PROGRAM AND APPARATUS FOR ANALYZING SYMBOLS IN A COMPUTER SYSTEM

CROSS-REFERENCES TO RELATED APPLICATIONS

This application is a U.S. National Stage Application of PCT/GB2010/050074, filed Jan. 19, 2010; which claims the benefit of U.S. Provisional Application No. 61/145,881, filed Jan. 20, 2009.

BACKGROUND OF THE INVENTION

The present invention relates to a method, a computer program and apparatus for analyzing symbols in a computer system.

There are many examples of computer systems in which it is useful to be able to analyze symbols passing through or stored in the computer system. As appreciated from the following, the term "symbols" in this context is to be construed broadly. In general, the term "symbols" is used herein in the broad sense as used in the field of Universal Turing Machines. For example, "symbols" includes computer messages, which term is also to be construed broadly and includes for example computer messages in a computer language (including computer instructions, such as executable programs), natural languages in computer-readable form (such as in documents, emails, etc.). "Symbols" also includes computer data in the conventional sense, i.e., typically, abstractions of real world artifacts, etc.

Individual computer messages entering into or passing through a computer system are often one element of a more complicated transaction that it is intended to be processed by the computer system. Such a transaction is also known as a "workflow". The individual computer messages can be generated by for example an application (i.e. some computer software), typically at the instigation of a user, as part of an overall process or "workflow". Such workflows are often business related.

The discovery, monitoring and control of workflow is beneficial in a number of domains, including but not limited to: security, operational effectiveness, metering and quality assessment. In the security domain, determining what are normal and expected workflows with sufficient accuracy allows the automated detection of anomalies. Anomalous workflows can be controlled in a number of ways. For example, they can be logged for later forensic analysis; they can trigger an alarm or alert so that immediate attention is given to them; they can be controlled by preventing them from being committed or terminated early; they can be redirected to alternative resources (e.g. as in load balancing); and they can be dynamically restructured to provide a more acceptable outcome. In the operational effectiveness domain, accurate determination of appropriate workflow can ensure that only the correct resources are used (e.g. workflows that do not interact with the correct information can be prevented from or redirected the appropriate resources); workflows that consume an undesirable proportion of resources (e.g. time, memory and/or power) can be identified and remediated; and workflows that include redundant operations can be recast into more effective workflows. In the metering domain, the accurate measurement of workflows provides non-repudiable evidence for accountancy (e.g. for charging in a pay-as-you-use manner). Last, workflows that have been effectively identified can be subjected to some quality criteria so that the developers of such workflows can understand and improve the workflows to a higher level of quality.

BRIEF SUMMARY OF THE INVENTION

The present invention is principally concerned with the extraction of plausible sub-sequences of messages from sequences of messages. The sub-sequences can then be used to identify workflows, which can then be monitored, controlled, etc., as desired and as described in general terms above.

According to a first aspect of the present invention, there is provided a computer-implemented method of analyzing messages in a computer system to allow workflows constituted by the messages to be identified, the method comprising:

analyzing a sequence of messages in a computer system in order to classify the messages, thereby producing a corresponding sequence of classifications of the messages; and, applying sequence induction to the sequence of classifications of the messages to produce (i) a set of sub-sequences of the classifications of the messages and (ii) a sequence grammar for the sub-sequences, from which a workflow constituted by the sequence of messages can be identified.

The messages, which typically are entering or attempting to enter a computer system and which comprise the sequence of elements that make up a workflow, can be observed or collected by standard eaves-dropping techniques. When considering computing resources and computer networks, the messages can for example be observed by "sniffing" the traffic passing through the computer system or carried by the network. Having collected sequences of messages, the extraction of plausible sub-sequences of classifications of the messages and their grammar can then be used to identify complete and partial workflows. Initially, in a "set-up" phase, a human analyst will identify workflows from the sub-sequences and their grammar. These workflows can be described in a policy workflow description. The policy workflow description can then be monitored and enforced in a running system in which the complete and partial workflows are extracted automatically from the sub-sequences and their grammar and compared to workflows as described in the policy workflow description. The workflows that have been identified can then be used for a number of purposes, including for example securing workflows, metering workflows for accountancy purposes, improving operational effectiveness of process relying on workflows, determining inappropriate workflows and reforming and redirecting inappropriate workflows.

In an embodiment, the sequence of messages is analyzed and the messages are classified by clustering the messages according to the semantic intent of the messages. Whilst this classification by clustering the messages according to the semantic intent of the messages is the most preferred method, principally for reasons of efficiency (i.e. speed), other approaches may be used, such as clustering the messages according to their syntax.

In an embodiment, the sequence of messages is analyzed and the messages are classified by clustering the messages according to similarity of the messages.

In an embodiment, the classification of a message is the numbers returned in the path sequence of a successful derivation path taken by the message when a stochastic logic program is fitted to the message.

These embodiments make use of the "clustering" techniques disclosed in our EP-A-1830253, US-A-2007/0185703 and U.S. patent application Ser. No. 12/187,104 and discussed in more detail below. This provides a very efficient and quick way of appropriately analyzing the messages.

In an embodiment, the method comprises storing a copy of each of the messages to allow a representation of the messages and the corresponding sub-sequences of the classifications of the messages and sequence grammars for the sub-sequences to be displayed to a user. This provides the user with a way of easily identifying workflows corresponding to the messages. As well as the copy of each message, other attributes about the message can be stored, including for example: the date and time the message was received; the username or application name that sent the message; network addressing information about the source and destination of the message; and such like.

In an embodiment, the method comprises automatically identifying a workflow constituted by the messages from the set of sub-sequences of the classifications of the messages and the sequence grammar for the sub-sequences. In an embodiment, the method comprises comparing the automatically identified workflow with previously stored workflow descriptions. As noted above, a policy workflow description can then be monitored and enforced in a running system in which the complete and partial workflows are extracted automatically. The workflows that have been identified can then be used for a number of purposes, including for example securing workflows, metering workflows for accountancy purposes, improving operational effectiveness of process relying on workflows, determining inappropriate workflows and reforming and redirecting inappropriate workflows.

In an embodiment, the set of sub-sequences of the classifications of the messages and the sequence grammar for the sub-sequences are obtained by building rules that describe bigrams formed between classifications of the messages in the sequence of classifications of the messages.

In an embodiment, the choice to build a new rule is based on all the bigrams that can be formed given the most recent classification in the input sequence of classifications of the messages and each of the classifications in the sequence of classifications of the messages falling within a window.

In an embodiment, the choice to build a new rule is based on considering each of the classifications in the sequence of classifications of the messages falling within a window as a single set.

In an embodiment, the choice to build a new rule takes into account the temporal proximity of the classifications in the sequence of classifications.

These embodiments are particularly helpful in providing a level of robustness against noise.

A further aspect of the present invention includes a computer arranged, configured and/or controlled to perform the method of the first aspect of the present invention.

BRIEF DESCRIPTION OF THE DRAWINGS

Embodiments of the present invention will now be described by way of example with reference to the accompanying drawings, in which:

FIG. 3 shows an example of message classification for four specific messages;

FIG. 4 shows an example of a sequence of message classifications;

DETAILED DESCRIPTION OF THE INVENTION

In broad terms, embodiments of the present invention operate as follows. A stream of computer messages is captured. The stream of messages is analyzed into its constituent components, including in particular the semantic structures to determine precisely the intent of the stream of messages. This provides a classification of each of the constituent messages. Sequence induction methods are then applied to produce a description of the sequences observed based on their classification. The description is further generalized. The underlying sequence elements are then grouped and analyzed so that a unified policy can be assigned to the entire group of sequences. This allows for example an operator to approve the elements of the generalized sub-sequences by assessing their appropriateness in the context of the behavior of the computer system. It also allows the installation of an approved baseline of sub-sequences (or workflows) that can be enforced as a control policy. It also allows a determination, in real time, of correct, incorrect, and novel sequences.

Figure 1:
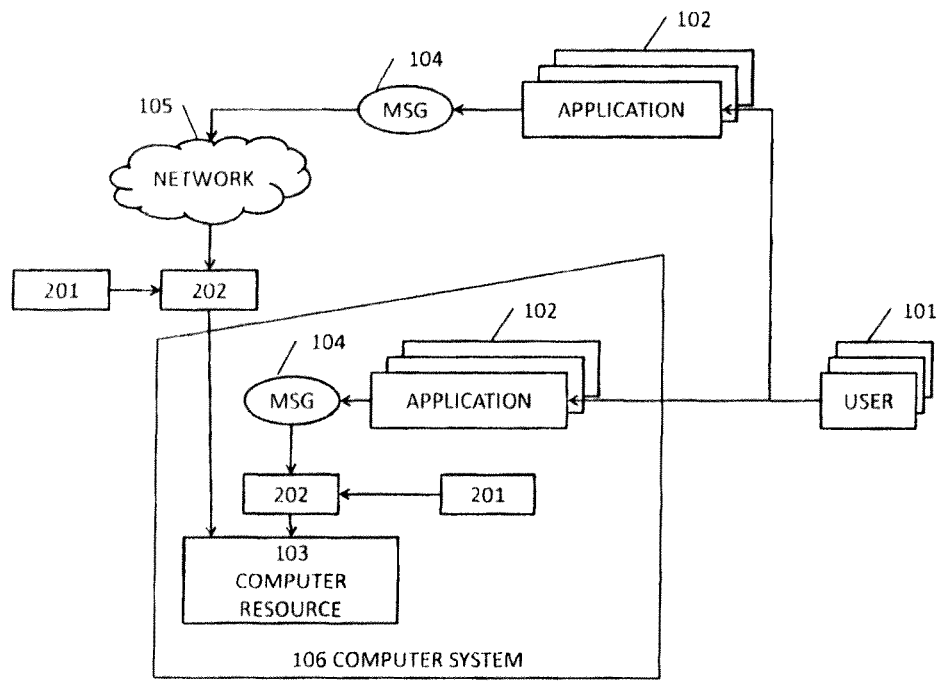
FIG. 1 shows schematically a computer system interacting with applications.

Referring now to FIG. 1, there is shown schematically a user 101 using (computer software) applications 102 to interact with a computer resource 103. The interaction with the computer resource 103 is mediated through some computer language via the transmission of messages (MSG) 104 within the computer language. The computer resource 103 may be made available to the applications 102 either directly, for example in the case that the applications 102 and computer resource 103 are part of the same computer system 106, or indirectly, for example via a computer network 105 in the case that the applications 102 are outside the computer system 106. In either case, the messages 104 can be observed by some observation process 202 and the intent of the message can be determined via a determination process 201.

Figure 2:
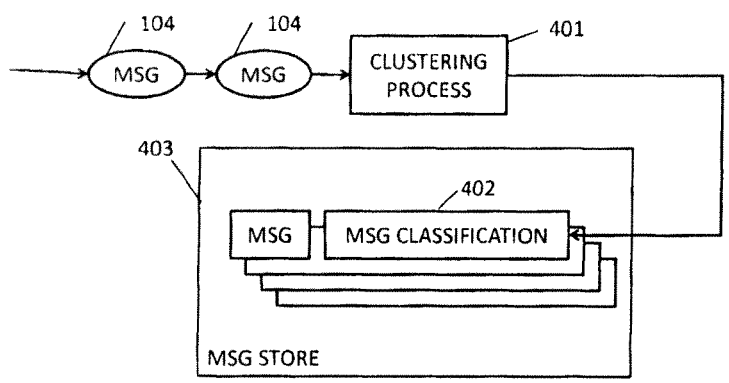
FIG. 2 shows schematically the collection and clustering of message sequences.

As mentioned, the interactions that users 101 have with the applications 102 make up the workflows of the computer system 106. These workflows can be effectively determined by the observation process 202 observing the sequences of messages 104 arriving at the computer system 106 which are then subject to the determination process 201. A preferred determination process 201 is shown schematically in FIG. 2.

Reference is made here to our EP-A-1830253, US-A-2007/0185703 and U.S. patent application Ser. No. 12/187,104, the entire contents of which are incorporated herein by reference. In these patent applications, there are disclosed methods for analyzing symbols in a computer system. These methods, which we refer to as "Efficient Grammatical Clustering" (EGC), provide a mechanism to understand usage patterns based on the semantics of messages entering (or leaving) computer systems. This allows for example the different database commands entering a relational database system to be recognized so that a baseline of normal behavior can be determined. EGC enables all new commands/messages (i.e. those that have not been seen previously by the system) to be recognized so that a proactive device can determine whether the message should be allowed to pass to the database or not. The preferred embodiments of the present invention make use of the ECG techniques disclosed in our EP-A-1830253, US-A-2007/0185703 and U.S. patent application Ser. No. 12/187,104 as part of the determination process 201. These techniques can be fully understood from a review of these patent applications and will only be described relatively briefly here. It should be noted that whilst it is preferred to analyze and classify the messages according to their semantic intent, other approaches may be used, such as analyzing and classifying the messages according to their syntax.

Referring again to FIG. 2, the sequence of messages 104 are "clustered" by the clustering process 401 disclosed in our EP-A-1830253, US-A-2007/0185703 and U.S. patent application Ser. No. 12/187,104. This produces a classification 402 of each message (MSG CLASSIFICATION) which are stored along with a copy of the respective messages 104 in a message store (MSG STORE) 403. (Referring again to our EP-A-1830253, US-A-2007/0185703 and U.S. patent application Ser. No. 12/187,104, the classification of a message in this context is the numbers returned in the path sequence of a successful derivation path taken by the message when the corresponding stochastic logic program is fitted to the message, i.e. the clause identifiers for the relevant instrumented predicate (given in reverse order).) As well as the copy of each message 104, other attributes about the message 104 can be included in the message store 403. This can include for example: the date and time the message 104 was received; the username or application name that sent the message 104; network addressing information about the source and destination of the message 104; and such like.

For each message 104, the clustering process 401 provides a unique classification of the semantic intent of the message 104 (this being the MSG CLASSIFICATION 402 that is stored in the message store 403). This uniqueness of classification allows messages 104 that are syntactically different to be classified in the same way (i.e. to be classified as being of the same "type" or class) on the basis that their class of semantic intent is identical.

In a particular example, in the context of a computer resource 103 that is a relational database, the messages 104 may be received at the computer resource 103 in the language of Structured Query Language (SQL). An example of the unique message classification 402 for four specific SQL messages, in the sequence in which they arrived, is shown in FIG. 3. An example of a sequence of message classifications 402 stored in the message store 403 is shown in FIG. 4. It should be noted that, in general, the messages can be a sequence of "tokens" forming a "sentence" in any language. This applies in general to all computer languages, including those languages for intercommunication (e.g. XML, SOAP), protocol languages (e.g. SIP) and scripting languages (e.g. JavaScript), and even to natural (human) languages.

The preferred embodiment then makes use of the message classifications 402, stored in the message store 403, to automatically induce sub-sequences of the message classifications and their descriptions so that the sub-sequences of the messages can be identified with actual workflows, thus allowing the underlying workflow process to be generated or identified. The workflow discovery process of the preferred embodiment is based on a sequence induction process and shown schematically in FIG. 5. It may be noted that, in general, it is not always possible to obtain a specification for the process that is generating workflows, for example because the documentation is no longer available or is not accurate.

Figure 5:
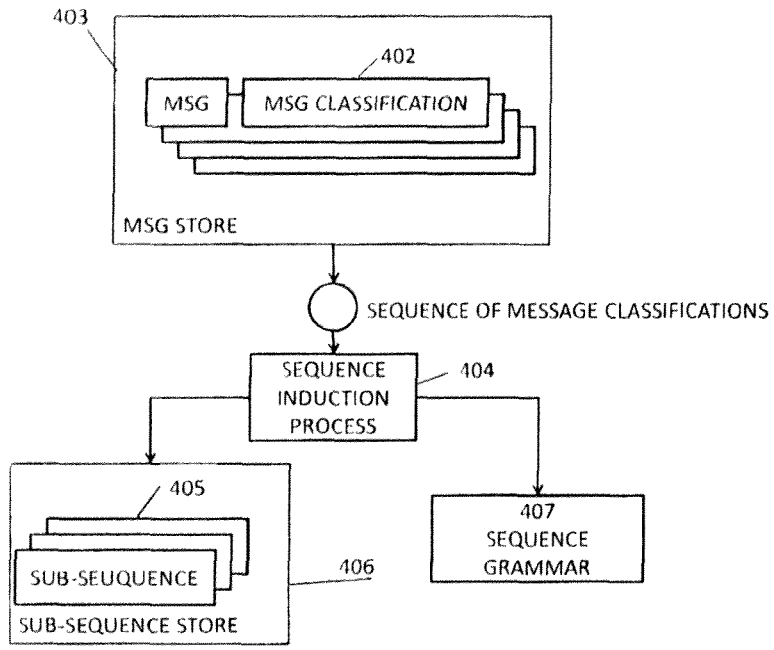
FIG. 5 shows schematically an example of sequence induction of messages that have been classified.

Thus, referring to FIG. 5, the sequence of message classifications 402 is input to a sequence induction process 404 which produces (i) a set of sub-sequences 405 of the of message classifications 402 which are held in a sub-sequence store 406 and (ii) a sequence grammar 407 which provides a generative description of the sub-sequences 405, i.e. the syntax to which the sub-sequences conform.

A number of techniques for the sequence induction process 404 are possible. The preferred embodiment makes use of grammatical induction to efficiently detect subsequences from high rate streams. A modified form of the known SEQUITUR algorithm may be employed for this. SEQUITUR is a recursive algorithm that was designed for use as a lossless compression/decompression technique. As described further below, SEQUITUR can be used for inferring a compositional hierarchical structure from strings, i.e. sequences of discrete symbols. It detects repetition and factors it out of the string by forming rules in a grammar. The rules can be composed of "non-terminals", giving rise to a hierarchy. It is useful for recognizing lexical structure in strings, and excels at very long sequences.

In general, one method for sequence induction, i.e. extracting useful recurring sequences from (typically much) larger sequences, is to use or modify techniques used for performing data compression. Many of these techniques stem from information theory principles (e.g. those described by Claude Shannon). Many compression techniques that are good at data compression do not extract valuable structural information from the data to be compressed. One compression technique that provides good compression properties as well as generating a comprehensible and useful internal structure is SEQUITUR. SEQUITUR, in its original form, is focused on data compression rather than extracting sequence information from temporal data, and has significant limitations. The following description will describe the basic SEQUITUR technique and then preferred modifications that allow sequences to be extracted from noisy temporal sequences.

SEQUITUR was primarily developed as a lossless data compression technique. The preferred embodiments of the present invention utilizes a by-product of the SEQUITUR technique to induce sequences.

To achieve compression of data, SEQUITUR takes as an input a sequence of tokens (also known as an input stream) and processes the sequence sequentially from the first element to the last element. The output of the process is a rewritten input sequence (known as rule 0) and a set of rewrite rules in the form of a context-free grammar. Rule 0 is typically much shorter than the input sequence. Rule 0 may contain either the original element or a rule number. To uncompress Rule 0, every rule number mentioned in Rule 0 is replaced with the rule's rewrite symbols (which may themselves contain the original elements from the input sequence (known as "terminals") and/or rule numbers). If the rewrite symbol is another rule, the process is recursively continued until the "terminals" are reached. This guarantees that the original input sequence is precisely recovered from the compressed Rule 0 and all of the descendent rules.

As an illustrative example, consider the sequence of characters "abcabdabcabd". The compressed output produced by SEQUITUR is the set of rewrite rules as follows:

0->1 1
1->2 c 2 d
2->a b

To reconstruct the original input from the rules, start with Rule 0 and rewrite the rule with the right hand side of the rule. This process is recursively repeated until no rule numbers exist. This ensures that the original input is recovered. The following four steps illustrate this:

0→1 1—replace Rule 0 with two occurrences of Rule 1
1 1→*2 c 2 d 2 c 2 d—replace each occurrence of Rule 1 with Rule 1's right hand side 2 c 2 d 2 c 2 d→a b c a b d a b c a b d—replace each occurrence of Rule 2 with Rule 2's right hand side a b c a b d a b c a b d—Stop—the is the complete uncompressed version of Rule 0 as no rule numbers exist in the sequence.

SEQUITUR builds rules by considering bigrams formed between two consecutive tokens of the input stream. When a bigram occurs more times than some pre-set threshold in any rule (including the Rule 0 input stream), then the bigram is assigned the next unused rule number, and every occurrence of the bigram in any existing rule (including Rule 0) is replaced with the new rule number. Also, a new rule with this new rule number is added to the list of rules with the new rule number on the left hand side and the bigram tokens on the right hand side. If the result of the creation of a new rule leaves an existing rule no longer participating in the hierarchy, then that existing rule is deleted from the rule set. The result of the process is a hierarchical rule set where each rule has some utility when decompressing Rule 0 back into the original input stream of tokens.

It is possible to work out the uncompressed sequences that relate to any rule. In the context of the preferred embodiments of the present invention, these induced sequences can be used to identify workflows. For example, the full expansion of Rule 1 in the example above is "abcabd" which occurs twice in the original input stream and therefore may be worthy of being assigned some level of importance. If the input stream consists of transaction components, then SEQUITUR's output will contain sequences that may relate to workflows.

A key deficiency of SEQUITUR for present purposes is that it assumes a total ordering of the sequence. When extracting potentially useful sub-sequences from the original input stream, SEQUITUR fails to take into account temporal proximity between the arrival of successive input tokens. SEQUITUR considers the bigram "a b" in the same way whether "b" follows "a" by a millisecond or whether "b" follows "a" an hour later. For the discovery of transaction workflows this is important. Furthermore SEQUITUR is not robust against a noisy input. Consider two inputs "abababab" and "ababadbaba" where in fact the second input is the same as the first, but is contaminated with a spurious "d". SEQUITUR is poor at ignoring the spurious "d". In monitoring workflows in real computer systems, it often happens that something abnormal is interspersed with the underlying workflow.

The preferred embodiments of the present invention make use of a number of improvements or modifications of SEQUITUR to improve the robustness of inducing sequences and sequence grammars.

First, the preferred embodiments of the present invention may make use of a sliding window/multiple bigram approach during the rule-building phase. A sliding window of a fixed size is now used when considering bigrams for the decision on building rules. The choice to build a new rule is based on all the bigrams that can be formed given the most recent token in the input and each of the tokens in the window of size W in the input.

Consider the following illustrative example. Assume a window size of 3. With the input seen so far being "abababc" and the next input token being "a", then the window contains the subsequence "abc" and the possible bigrams are: "ca" (which is the same as in the normal SEQUITUR case), "ba" and "aa". The rest of the rule building proceeds as with the normal SEQUITUR. It may be noted that it is not possible to use this as a compression/decompression technique. However, it is useful in the present context as part of a sequence induction technique whilst providing a level of robustness against noise.

Secondly, the preferred embodiments of the present invention may make use of a generalized sliding window multigram approach during the rule-building phase. This is similar to the approach just described. Instead of forming multiple bigrams, it considers the entire window contents with the newly arrived token as a single set. This set then provides mapping to a new rule number if required.

Consider the following illustrative example. Again, assume a window size of 3. With the input seen so far being "abababc" and the next input token being "a", then the window contains the subsequence "abc". The sequence including the arriving token "a" becomes "abca", which as a set (sorted alphabetically) is {a, b, c}. This unique set can then be used to determine a unique rule number. The rest of the rule building proceeds as with the normal SEQUITUR. Again, it may be noted that it is not possible to use this as a compression/decompression technique. However, it is useful in the present context as part of a sequence induction technique whilst providing a level of robustness against noise.

A further modification is to consider the building of a bigram taking into account the temporal proximity of the tokens in the input stream during the rule-building phase. This can be applied to normal SEQUITUR or either of the two modifications mentioned immediately above.

Consider an input stream "a-1-b-5-a-1-b-5-a-1-b" where the digit "N" (1 and 5 being the only digits present in this example) separating two tokens represents the time between the arrivals of the tokens. A maximum time delay can be added as a threshold to control whether a bigram is built. If, in this example, the maximum time considered is 2 then the bigram "ab" is considered (1<2), whilst the bigram "ba" is not considered (5>2). The rest of the rule building proceeds as with the normal SEQUITUR. Again, it may be noted that it is not possible to use this as a compression/decompression technique. However, it is useful in the present context as part of a sequence induction technique whilst providing a level of robustness against noise.

It will be understood that many further variations are possible. Bigram and rule building could be triggered by a form of average of the marginal arrival times of a sequence of tokens, such as the geometric mean. Bigram and rule building could be triggered by some form of spectral analysis of the arrival time differences.

Having obtained the sub-sequences, analysis of the utility of the extracted subsequences can then be carried out by a (human) analyst. The analyst can be provided with a visualization of the original sequence with overlays of the extracted sub-sequences and the sequence grammar. This is shown schematically in FIG. 6. In the workflow identification process 501, the sub-sequences 405 and the sequence grammar 407 are presented visually to a workflow user or analyst 103 in the form of a sequence grammar visualization 502 and a sub-sequence visualization 503. This allows the workflow user 103 to identify workflows that correspond to the sub-sequences and therefore to specify workflows from the sub-sequences and make corresponding workflow descriptions 507 which are kept in a workflow description store 508 for use as described further below.

Figure 7:
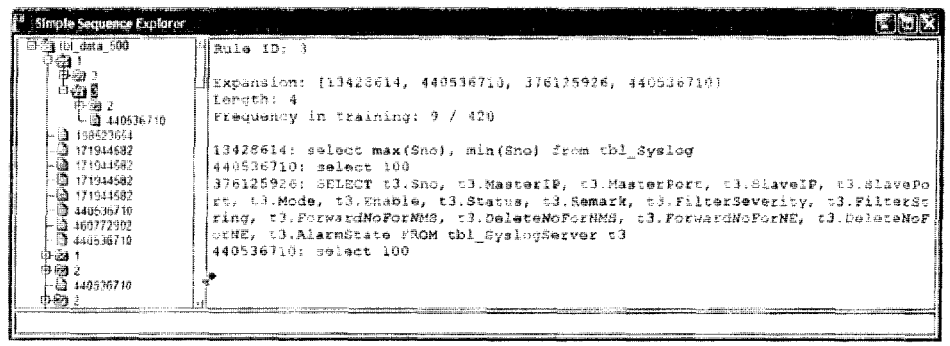
FIG. 7 shows an example of a visualization of a sequence grammar which can be presented to a user.
Figure 8:
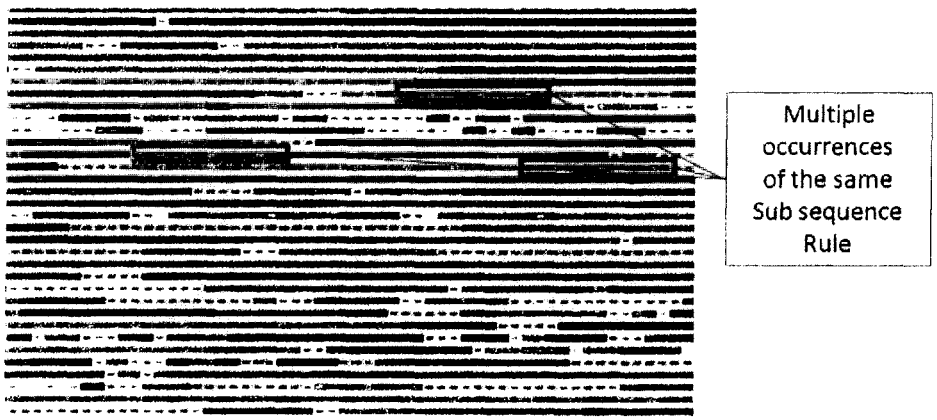
FIG. 8 shows an example of a visualization of a sub-sequence which can be presented to a user.

Examples of a sequence grammar visualization 502 and a sub-sequence visualization 503 are shown in FIGS. 7 and 8 respectively. As shown in FIG. 7, the familiar computer file system browser metaphor is used to browse the sequence grammar. The "folders" are rules that describe sub-sequences 405 of message classifications 402 while the "files" are individual messages 104 in the language. For the example in FIG. 7, the messages 104 are SQL statements. In FIG. 8, a map is produced and shown whereby each message classification is indicated by a unique color code (seen as the shaded square dots in the black and white figure). The original sequence is presented by the square dots from left-to-right, top-to-bottom. For square dots (i.e. the message classifications) that have been identified by the sequence induction process 404 to belong to a sub-sequence 405 from the sub-sequence store 406, the subsequence number is given a unique color and the presented as a rectangle overlaying the message classifications. This allows the workflow user 103 to identify common sequences and describe them for the workflow description store 508.

Having identified workflows and having stored descriptions of them in the workflow description store 508, further sequences of messages 104 entering or attempting to enter the computer system 106 can be automatically analyzed in the same manner and compared to the stored workflow descriptions. Thus, the workflows of the further messages 104 can be discovered, monitored and/or controlled as described in general terms above.

Figure 9:
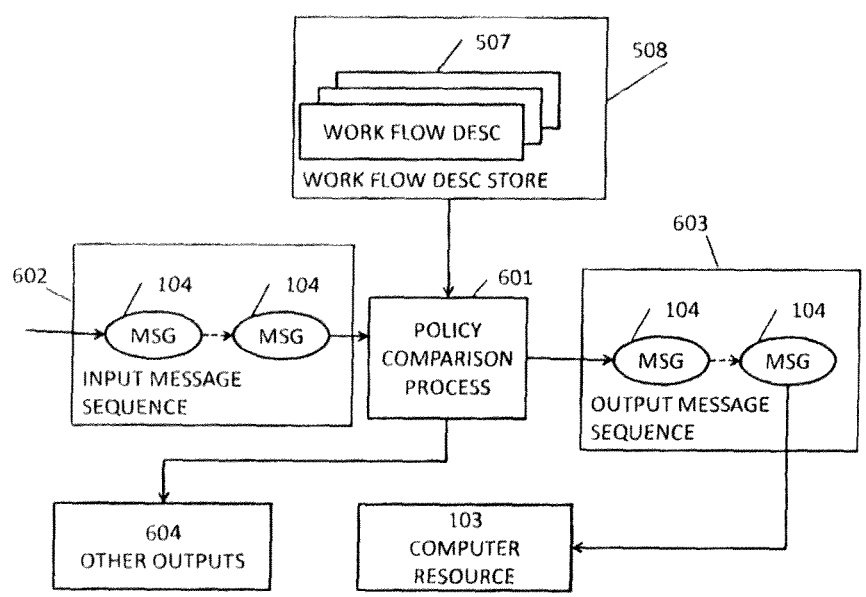
FIG. 9 shows schematically an example of the enforcement of semantic sequences.

For example, having decided what are acceptable workflows in particular situations, and indeed having built a policy of acceptable workflows, an enforcement process can be put in place. An example of this is shown in FIG. 9. The policy of workflows described as workflow descriptions 507 are held in the workflow description store 508. An input message sequence 602 consisting of a sequence of messages 104 is intercepted by the policy comparison process 601. The policy comparison process 601 compares the arriving sequences of messages 104 with the workflow descriptions 507 stored in the workflow description store 508. An input message sequence 602 that is determined to be acceptable by the policy comparison process 601 will be passed as an output message sequence 603 to the destination computer resource 103 without further processing. On the other hand, an input message sequence 602 determined by the policy comparison process 601 as requiring some other action will result in an alternative output message sequence 603 to be sent to the destination computer resource 103. Such an alternative may be to initiate and terminate the sequence with begin and commit commands (e.g. as in the SQL way); may be to send an empty sequence of messages; may be to send a rollback message (e.g. as in the SQL way). A further result of the policy comparison process 601 may be to produce other outputs 604. For example, the other outputs 604 may be, but not limited to: send an alert; cause the sequence of messages to be recorded for further process; etc.

The preferred embodiments of the present invention provided for automatic and efficient extraction of plausible sub-sequences of messages from sequences of messages passing into or across a computer system. The sub-sequences can then be used to identify workflows, which can then be monitored, controlled, etc., as desired.

It will be understood that the methods described herein will typically be carried out by appropriate software running on appropriate computer equipment. The term "computer" is to be construed broadly. The term "a computer" or similar may include several distributed discrete computing devices or components thereof. The computer program may be in the form of source code, object code, a code intermediate source and object code such as in partially compiled form, or in any other form suitable for use in the implementation of the processes according to the invention. The software may be recorded on a carrier, which may be any entity or device capable of carrying the program. For example, the carrier may comprise a storage medium, such as a ROM, for example a CD ROM or a semiconductor ROM, or a magnetic recording medium, for example a floppy disk or hard disk. Further, the carrier may be a transmissible carrier such as an electrical or optical signal which may be conveyed via electrical or optical cable or by radio or other means.

Embodiments of the present invention have been described with particular reference to the examples illustrated. However, it will be appreciated that variations and modifications may be made to the examples described within the scope of the present invention.

What is claimed is:

1. A computer-implemented method of analyzing messages in a computer system to allow workflows constituted by the messages to be identified, the method comprising:
    analyzing a sequence of messages in a computer system in order to classify the messages, thereby producing a corresponding sequence of classifications of the messages; and,
    applying sequence induction to the sequence of classifications of the messages to produce (i) a set of sub-sequences of the classifications of the messages and (ii) a sequence grammar for the sub-sequences, from which a workflow constituted by the sequence of messages can be identified, wherein the set of sub-sequences of the classifications of the messages and the sequence grammar for the sub-sequences are obtained by building rules that describe bigrams formed between classifications of the messages in the sequence of classifications of the messages; and
    wherein a choice to build a new rule is based on all the bigrams that can be formed given the most recent classification in the input sequence of classifications of the messages and each of the classifications in the sequence of classifications of the messages falling within a window.

2. A method according to claim 1 wherein the sequence of messages is analyzed and the messages are classified by clustering the messages according to the semantic intent of the messages.

3. A method according to claim 1 wherein the sequence of messages is analyzed and the messages are classified by clustering the messages according to similarity of the messages.

4. A method according to claim 1 wherein the classification of a message is the numbers returned in the path sequence of a successful derivation path taken by the message when a stochastic logic program is fitted to the message.

5. A method according claim 1 further comprising storing a copy of each of the messages to allow a representation of the messages and the corresponding subsequences of the classifications of the messages and sequence grammars for the subsequences to be displayed to a user.

6. A method according to claim 1 further comprising automatically identifying a workflow constituted by the messages from the set of sub-sequences of the classifications of the messages and the sequence grammar for the sub-sequences.

7. A method according to claim 6 further comprising comparing the automatically identified workflow with previously stored workflow descriptions.

8. A method according to claim 1 wherein the choice to build a new rule is based on considering each of the classifications in the sequence of classifications of the messages falling within a window as a single set.

9. A method according to claim 1 wherein the choice to build a new rule takes into account the temporal proximity of the classifications in the sequence of classifications.

10. A computer readable storage medium storing instructions that, when executed by a computer, cause the computer to perform a method of analyzing messages in a computer system to allow workflows constituted by the messages to be identified, the method comprising:

analyzing a sequence of messages in a computer system in order to classify the messages, thereby producing a corresponding sequence of classifications of the messages; and, applying sequence induction to the sequence of classifications of the messages to produce (i) a set of sub-sequences of the classifications of the messages and (ii) a sequence grammar for the sub-sequences, from which a workflow constituted by the sequence of messages can be identified, wherein the set of sub-sequences of the classifications of the messages and the sequence grammar for the sub-sequences are obtained by building rules that describe bigrams formed between classifications of the messages in the sequence of classifications of the messages; and wherein a choice to build a new rule is based on all the bigrams that can be formed given the most recent classification in the input sequence of classifications of the messages and each of the classifications in the sequence of classifications of the messages falling within a window.

11. The computer readable storage medium set forth in claim 10 wherein the instructions cause the computer to analyze the sequence of messages and classify the messages by clustering the messages according to the semantic intent of the messages.

12. The computer readable storage medium set forth in claim 10 wherein the instructions cause the computer to analyze the sequence of messages and classify the messages by clustering the messages according to similarity of the messages.

13. The computer readable storage medium set forth in claim 10 wherein the classification of a message is the numbers returned in the path sequence of a successful derivation path taken by the message when a stochastic logic program is fitted to the message.

14. The computer readable storage medium set forth in claim 10 wherein the instructions further cause the computer to store a copy of each of the messages to allow a representation of the messages and the corresponding subsequences of the classifications of the messages and sequence grammars for the subsequences to be displayed to a user.

15. The computer readable storage medium set forth in claim 10 wherein the instructions further cause the computer to automatically identify a workflow constituted by the messages from the set of sub-sequences of the classifications of the messages and the sequence grammar for the sub-sequences.

16. A system for analyzing messages in a computer system to allow workflows constituted by the messages to be identified, the system comprising:

at least one processor; and
  a memory coupled to the at least one processor and configured to store computer instructions that, when executed, cause the processor to perform a method of analyzing messages in a computer system to allow workflows constituted by the messages to be identified, the method comprising:

analyzing a sequence of messages in a computer system in order to classify the messages, thereby producing a corresponding sequence of classifications of the messages; and, applying sequence induction to the sequence of classifications of the messages to produce (i) a set of sub-sequences of the classifications of the messages and (ii) a sequence grammar for the sub-sequences, from which a workflow constituted by the sequence of messages can be identified, wherein the set of sub-sequences of the classifications of the messages and the sequence grammar for the sub-sequences are obtained by building rules that describe bigrams formed between classifications of the messages in the sequence of classifications of the messages; and wherein a choice to build a new rule is based on all the bigrams that can be formed given the most recent classification in the input sequence of classifications of the messages and each of the classifications in the sequence of classifications of the messages falling within a window.

17. A system according to claim 16 wherein the sequence of messages is analyzed and the messages are classified by clustering the messages according to the semantic intent of the messages.

18. A system according to claim 16 wherein the sequence of messages is analyzed and the messages are classified by clustering the messages according to similarity of the messages.

19. A system according to claim 16 wherein the classification of a message is the numbers returned in the path sequence of a successful derivation path taken by the message when a stochastic logic program is fitted to the message.

20. A system according to claim 16 wherein the memory further includes instructions which, when executed by the at least one processor, cause the processor to store a copy of each of the messages to allow a representation of the messages and the corresponding subsequences of the classifications of the messages and sequence grammars for the subsequences to be displayed to a user.

* * * * *

UNITED STATES PATENT AND TRADEMARK OFFICE
CERTIFICATE OF CORRECTION

| | | |
|---|---|---|
| PATENT NO. | : 8,825,473 B2 | Page 1 of 1 |
| APPLICATION NO. | : 13/145292 | |
| DATED | : September 2, 2014 | |
| INVENTOR(S) | : Moyle | |

It is certified that error appears in the above-identified patent and that said Letters Patent is hereby corrected as shown below:

Title Page, illustrative figure, under Reference Numeral 405, line 1, delete "SEUQUENCE" and insert -- SEQUENCE --, therefor.

In the Drawings

On sheet 3 of 5, in figure 5, under Reference Numeral 405, line 1, delete "SEUQUENCE" and insert -- SEQUENCE --, therefor.

Figure 6:
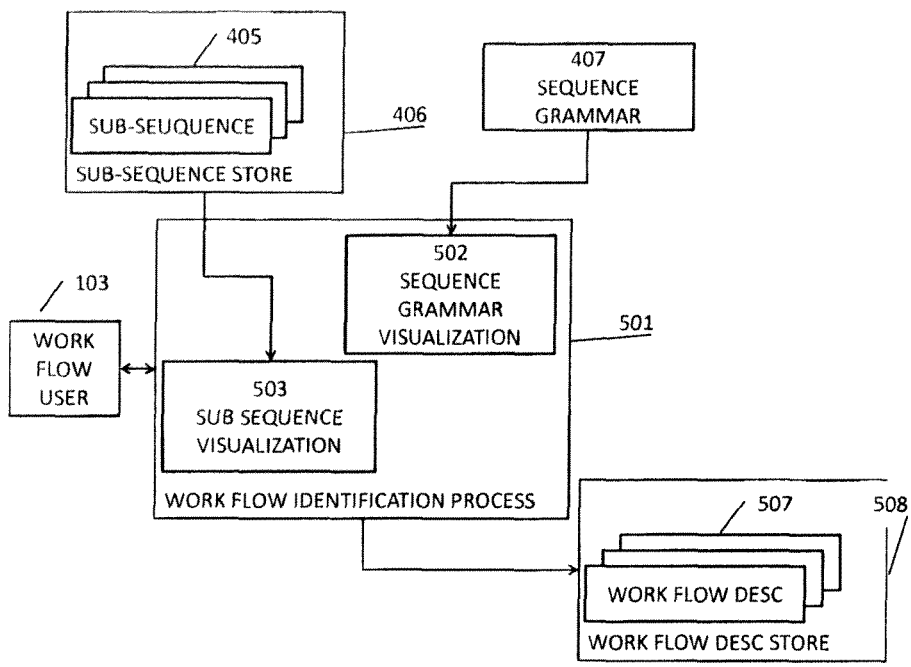
FIG. 6 shows schematically an example of the identification of the workflows and definition of the workflow descriptions.

On sheet 3 of 5, in figure 6, under Reference Numeral 405, line 1, delete "SEUQUENCE" and insert -- SEQUENCE --, therefor.

In the Specification

In column 5, line 66, delete "of the of" and insert -- of the --, therefor.

In the Claims

In column 10, line 46, in Claim 5, delete "according claim" and insert -- according to claim --, therefor.

Signed and Sealed this
Twenty-sixth Day of May, 2015

Michelle K. Lee
*Director of the United States Patent and Trademark Office*